(12) United States Patent
Chan et al.

(10) Patent No.: US 6,724,839 B1
(45) Date of Patent: Apr. 20, 2004

(54) ADAPTIVE INTER-SYMBOL INTERFERENCE BOOST EQUALIZATION APPARATUS AND METHOD

(75) Inventors: Ivan Chan, Kanata (CA); Russell W. Brown, Nepean (CA); Mehran Aliahmad, Ottawa (CA)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 09/514,572

(22) Filed: Feb. 28, 2000

(51) Int. Cl.$^7$ .............................. H03D 1/04; H04B 1/10; H04L 25/08
(52) U.S. Cl. ...................... 375/346; 375/232; 375/257; 375/285; 375/348; 375/350
(58) Field of Search ................................. 375/229, 230, 375/232, 236, 254, 257, 284, 285, 290, 345, 346, 348, 349, 350; 710/305

(56) References Cited

U.S. PATENT DOCUMENTS

| | | | | |
|---|---|---|---|---|
| 5,257,286 | A | * 10/1993 | Ray | 375/230 |
| 6,065,079 | A | * 5/2000 | Dupuy | 710/305 |
| 6,356,218 | B1 | * 3/2002 | Brown et al. | 341/120 |
| 6,483,879 | B1 | * 11/2002 | Gasparik | 375/257 |

OTHER PUBLICATIONS

"Ultra–320 SCSI Receiver Compensation Technique", Andrew Bishop Dec. 2, 1999, SCSI SPI–4 Meeting Rochester, MN, Quantum Corporation.

* cited by examiner

Primary Examiner—Chieh M. Fan
(74) Attorney, Agent, or Firm—Anthony L. Miele; Palmer & Dodge, LLP

(57) ABSTRACT

An apparatus mitigates inter-symbol interference effects on an oscillating signal from which digital data will be obtained at a receive end of a channel. The inter-symbol interference is introduced into the oscillating signal as a result of transmitting the oscillating signal through the transmission channel over a substantial distance from a transmit device to the receive end of the channel. A filter element receives an input signal from the transmit device and outputs a filtered signal within a predetermined frequency band. The filter element has a mechanism for adjusting a gain for a given range of frequencies within the predetermined frequency band. The given range of frequencies corresponds to higher frequencies in the predetermined frequency band. An amplitude determining mechanism determines a peak amplitude of the filtered signal. A boost gain control mechanism controls adjustments to the high frequency gain so that the peak-to-peak amplitude of the filtered signal is maintained within a predetermined amplitude range.

28 Claims, 6 Drawing Sheets

100

ADAPTIVE INTER-SYMBOL INTERFERENCE BOOST EQUALIZATION APPARATUS AND METHOD

BACKGROUND OF THE INVENTION

1. Field of the Invention

This invention generally relates to certain aspects of high speed computer parallel databus structures. More particularly, the present invention relates to a novel apparatus and method for improving the transmission of data between a computer and peripheral devices using parallel databus structures.

2. Description of Related Art

Typically, computers will have at least one parallel data bus infrastructure capable of accommodating the digital signals communicated between a host computers' processor and a peripheral hardware, such as a memory storage device. For example, as illustrated in FIG. 1A, host device 50 transmits digital data to a transmit parallel bus interface 60, which converts the digital data to a form suitable for transmission and transfers the data on the parallel bus 70. At the other end, the digital data is received by a receive parallel bus interface 80, which converts the digital data and transfers it to the memory storage device 90.

Such communications between the host device 50 and the memory storage device 90 may comply with one (or several) of the well-known Small Computer Standard Interfaces (SCSI) protocol. SCSI is a set of evolving electronic interface standards that allow computers to communicate with peripheral hardware in a parallel fashion. In doing so, SCSI interfaces are faster and more flexible than previous interfaces. For example, the Ultra-3 SCSI standard specifies a bus that can transfer data up to 160 Mbytes/sec and can interconnect up to 16 devices. TABLE 1 summarizes various attributes of the currently-adopted SCSI standards, below:

TABLE 1

| SCSI Standard | Max. Cable Length (m) | Max. Speed (Mbytes/sec) | Max. Number of Devices |
|---|---|---|---|
| SCSI-1 | 6 | 5 | 8 |
| SCSI-2 | 6 | 5–10 | 8 or 16 |
| Fast SCSI-2 | 3 | 10–20 | 8 |
| Wide SCSI-2 | 3 | 20 | 16 |
| Fast Wide SCSI-2 | 3 | 20 | 16 |
| Ultra SCSI-3, 8-bit | 1.5 | 20 | 8 |
| Ultra SCSI-3, 16-bit | 1.5 | 40 | 16 |
| Ultra-2 SCSI | 12 | 40 | 8 |
| Wide Ultra-2 SCSI | 12 | 80 | 16 |
| Ultra-3 (Ultra 160/m) SCSI | 12 | 160 | 16 |

SCSI interfaces are not, however, immune to signal distortion effects that are inherent in most digital transmission apparatuses. At fast digital data transmission speeds or long cable lengths, SCSI interfaces are susceptible to inter-symbol interference (ISI), which distorts a digital signal by temporally spreading and consequently overlapping the individual digital symbols. As digital data transfer speed increases, the ISI effects in communication via a long cable become substantial to the degree where simple voltage level detection becomes insufficient in distinguishing between logic level changes and, thus, the receiver may not be reliable enough to extract data from the incoming signal.

A major contribution to these ISI effects is due to the resistance (R) and capacitance (C) of the cable, which affects both the phase and amplitude of the digital signals conveyed by the cable. In fact, in addition to the resistance of the cable depending on the wire gauge, coating material, and the stranding configuration, the overall attenuation of the cable generally increases exponentially with frequency. Moreover, at longer cable lengths, the digital signal amplitude may vary in accordance with the data pattern. Thus, when evolving SCSI standards propose increasing the transfer rate (e.g., from 160 Mbytes/sec to 320 Mbytes/sec), the frequency components carrying the digital information are doubled, and the R-C effects become even more impairing. Under certain conditions, the isolated digital pulse amplitude can be too low to be reliably detected by a simple comparator, as currently used in SCSI environments To mitigate these ISI effects, one conventional approach equalizes the digital pulse signal by employing a second order zero ($s^2$) in the frequency domain to narrow the pulse into a pre-defined target shape. Such an approach is effective in reducing the amplitude distortions associated with ISI, but is relatively ineffectual in correcting phase distortion.

Another conventional approach incorporates a matched filter having a transfer function that is the inverse of the transmission media transfer function. In this manner, amplitude and phase distortions induced by the cable are neutralized. Although effective, the application of this approach is limited by the fact that SCSI interfaces utilize multiple signal lines, each of which may have a different cable impedance due to variances in wire gauge, coating materials, stranding arrangement, etc. Moreover, SCSI interfaces must accommodate a host of different apparatus configurations. These factors make it extremely difficult, if not economically unfeasible, to provide a single match filter that adequately covers the various cases.

SUMMARY

What is needed is a method and apparatus that can overcome the limitations of conventional approaches by providing an adaptive equalization technique that adaptively amplifies the frequency components that carry the digital data information and attenuates nonessential frequency components to reduce ISI and make data detection reliable. Moreover, the method and apparatus must be simple to implement and economically feasible.

An apparatus and a method utilize an adaptive equalization technique for mitigating inter-symbol interference effects on an oscillating signal from which digital data will be obtained at a receive end of a channel. Such an apparatus may include a filter element for receiving an input signal from a transmitting device and outputting a filtered signal within a predetermined frequency band. The filter element comprises a mechanism for compensating for the transmission channel losses in the signal frequency band, and increasing the rejection of undesired higher frequency signals. The apparatus and method also include an amplitude determining mechanism for determining the amplitude of the filtered signal and a gain control mechanism to adapt the filter characteristic for optimum compensation of the transmission channel losses at each individual receiver location on the parallel bus structure.

BRIEF DESCRIPTION OF THE DRAWINGS

The accompanying drawings, which are incorporated in and constitute a part of this Specification, and which illustrate an embodiment of the invention.

DETAILED DESCRIPTION

The following detailed description refers to the accompanying drawings that illustrate embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

Moreover, it will be apparent to one of ordinary skill in the art that the embodiments as described below may be implemented in many different embodiments of software, firmware, and hardware in the entities illustrated in the figures. The actual software code or specialized control hardware used to implement the present invention is not limiting of the present invention. Thus, the operation and behavior of the embodiments will be described without specific reference to the actual software code or specialized hardware components. It is understood that artisans of ordinary skill would be able to design software and control hardware to implement the embodiments of the present invention based on the description herein.

Figure 1A:
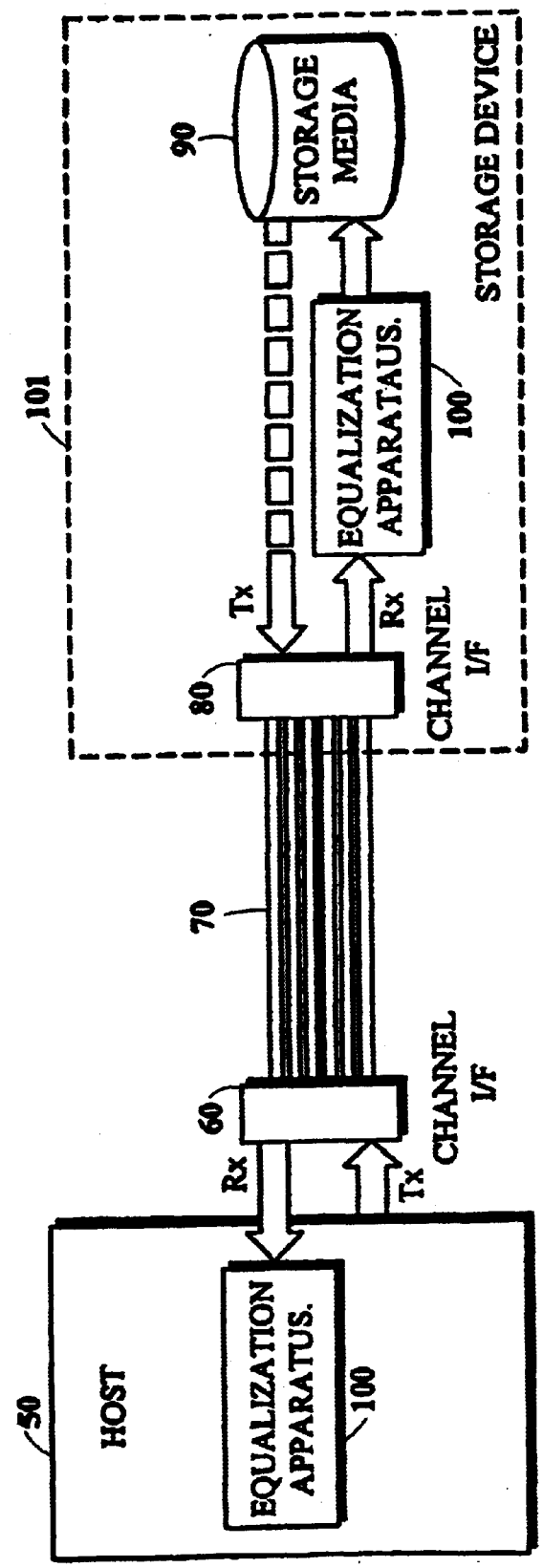
FIG. 1A is a high-level functional block diagram of a host coupled to a data storage device via a parallel bus interface and an equalization apparatus.

One embodiment of the present invention is shown in FIG. 1A. A host 50 is coupled to storage device 101 via a parallel connection channel 70. Specifically, in the illustrated embodiment, the parallel connection channel comprises a parallel cable terminating at each end with a channel interface 60 and 80. Storage device 101 may comprise, e.g., a CD ROM record/playback device, a tape drive, or a disk drive. Instead of a storage device 101, as shown, another peripheral device, e.g., a printer, may be coupled to the host via channel 70. As shown in FIG. 1A, a channel interface 80 is coupled to a storage media 90 via an equalization apparatus 100. The equalization apparatus 100 is coupled to those lines of channel 70 from which storage device 101 is receiving information (e.g., payload data transmitted in the form of an digital signals over each line).

Equalization apparatus 100 mitigates the effects of ISI introduced into oscillating signals carried by the lines of channel 70, particularly where channel 70 traverses a substantial distance from host 50 to the receive end at channel interface 80.

Because the data path is normally bi-directional, FIG. 1A also depicts an equalization apparatus 100 at the host device 50 as well. The equalization apparatus 190 at the host device 50 serves to mitigate the effects of ISI introduced in the transmission of data, such as, for example, from the storage media 90 to the host 50.

The equalization apparatus 100 shown in FIG. 1A comprises a filter element, which receives input signals transmitted by the transmitting device 50 and outputs filtered signals within a predetermined frequency band. The filter element has a mechanism for adjusting the gain of the filter for a specific frequency range. The specific frequency range corresponds to certain higher frequencies of the predetermined frequency band. In this manner, higher frequency components of the received signals are adjusted. Such adjustments are made to the higher frequency components of the received signals because they are more susceptible to ISI effects than lower frequency signals.

The apparatus 100 also comprises an amplitude determining mechanism, for determining the amplitudes of the filtered signals, and a gain control mechanism, for controlling the adjustments to the gain of the filter so that the amplitudes of the filtered signals are maintained within a predetermined range.

Figure 1B:
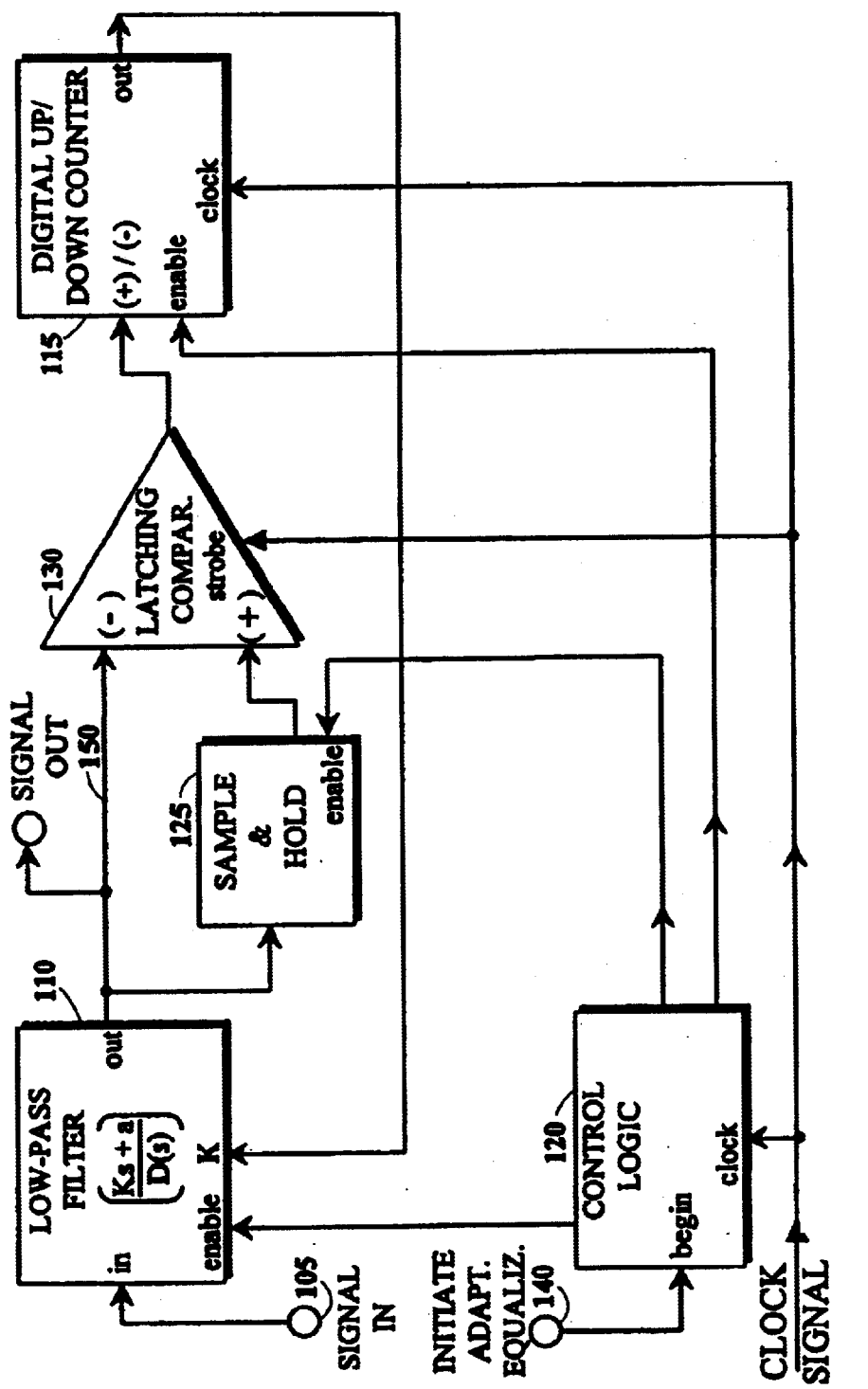
FIG. 1B is a high-level functional block diagram depicting a more specific embodiment of an equalization apparatus.

A more specific embodiment of the present invention is illustrated by high-level functional block diagram of FIG. 1B. The embodiment operates as an ISI adaptive equalization apparatus 100 and comprises a low-pass filter element 110, a control logic element 120, an up-down digital counter 115, a sample and hold element 125, and a latching comparator 130. Control logic element 120 is synchronized with digital counter 115 by receiving a clock signal.

Figure 2:
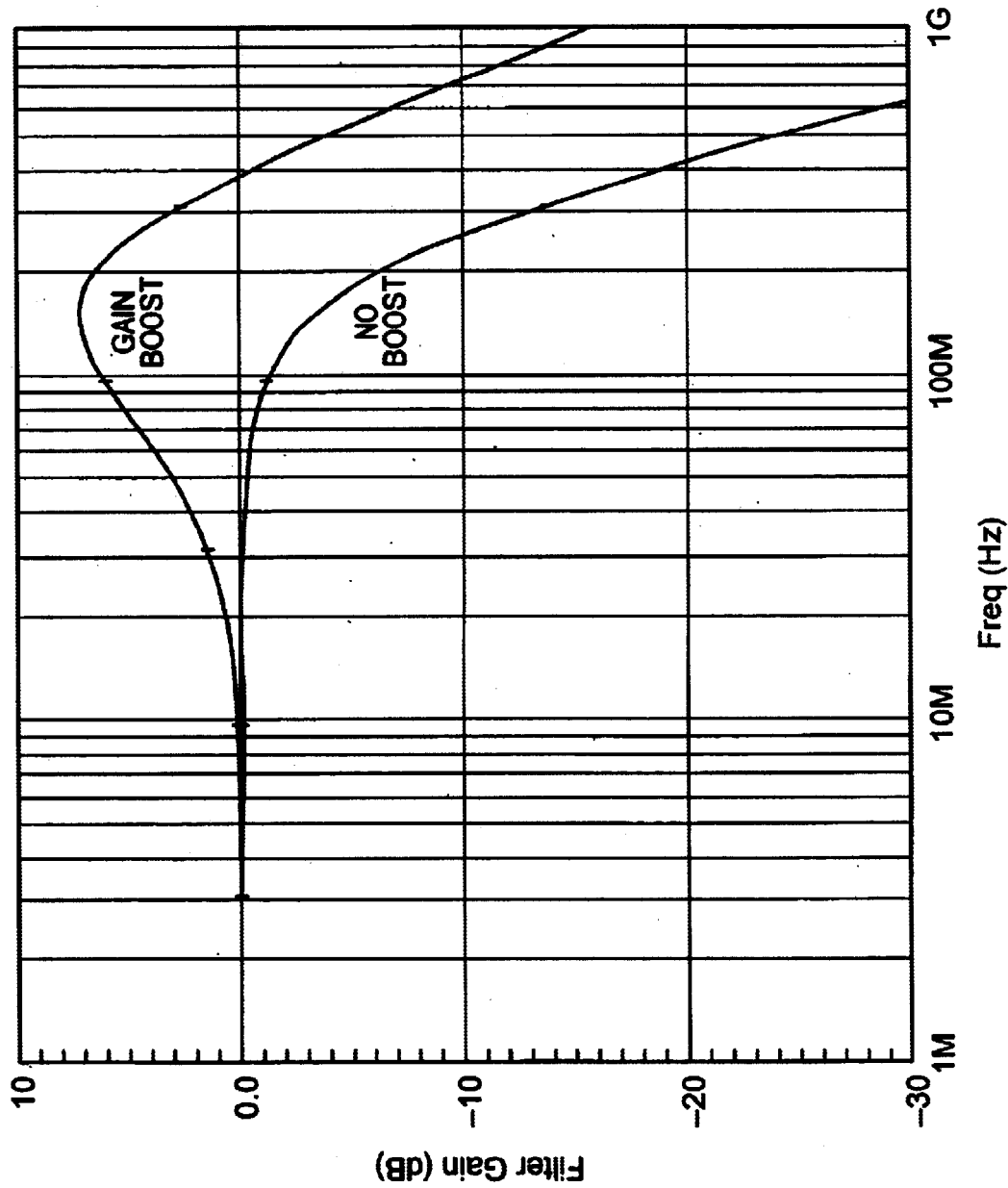
FIG. 2 illustrates the magnitude frequency response of a typical low-pass filter with and without a high frequency gain boost.

The equalization function is performed by the low-pass filter element 110. As depicted in FIG. 1B, the signal from a host device is inputted to the low-pass filter element 110. The low-pass filter element 110 has a transfer function characterized by: (Ks+a)/D(s). As is well-known in the art, the "Ks" term in the numerator of the transfer function indicates a 1st order boost with a gain of K. In this implementation, the boost gain K is adjustable and controlled by the up-down digital counter 115 output. FIG. 2 illustrates the magnitude frequency response of a typical low-pass filter with and without a high frequency gain boost.

Figure 1C:
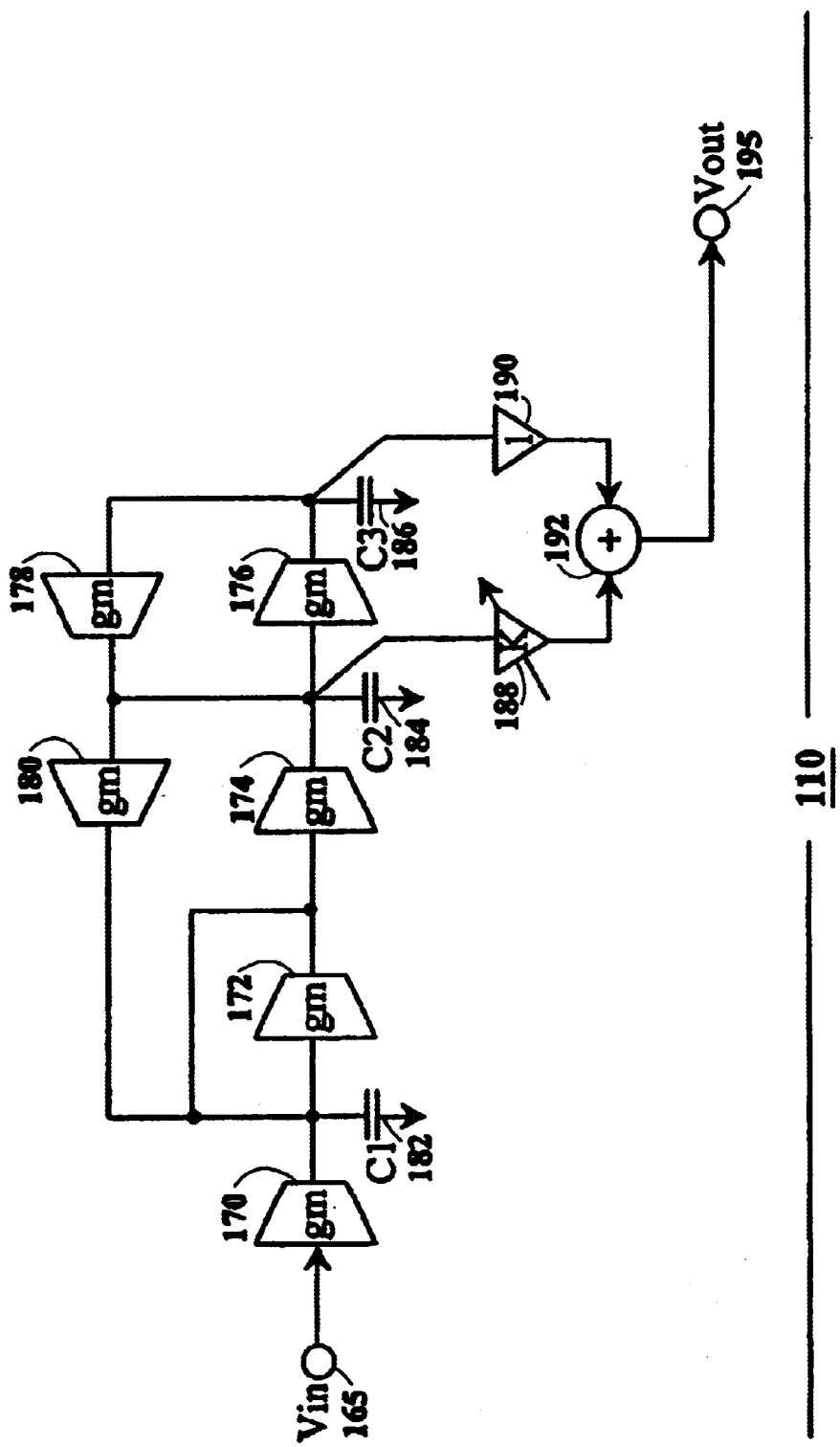
FIG. 1C is a functional block diagram illustrating an implementation of a low-pass filter element.

FIG. 1C illustrates an exemplary implementation of the low-pass filter element 110 employed by the ISI adaptive equalization apparatus 100. The illustrated low-pass filter element 110 is configured as a $3^{rd}$ order low pass filter comprising a plurality of transconductance amplifiers 170, 172, ... 180 with gain gm and a plurality of capacitors C1 182, C2 184, and C3 186. In this configuration, the input signal Vin 165 is applied to the first transconductance amplifier 170. The voltage on C2 184 provides the 1st order term and is amplified by adjustable amplifier 188 with boost gain K. The voltage on C2 184 is combined with the voltage on C3 186 to generate the output of the low pass filter output Vout 195. The low pass filter output Vout 195 is represented by:

$$Vo = K * V2 + V3$$

V2 is the voltage on C2 184 and V3 is the voltage on C3 186. The filter equation is represented by:

$$Vo(s) = [N(s)/D(s)] * Vi(s), \text{ where}$$

$$D(s) = s^3 + s^2 gm/C1 + sgm(C1+C3)/(C1C2C3) + gm/(C1C2C3), \text{ and}$$

$$N(s) = K sgm/(C1C2) + gm/(C1C2C3)$$

The magnitude of gm controls the filter bandwidth and the values of capacitors C1 182, C2 184, and C3 186 control the location of the filter's poles. Exemplary values for the low-pass filter-element 110 components include C1=0.56 pF, C2=1.12 pF, C3=7.25 pF, and gm=0.8 mA/V for data transfer rate at 160 Mbyte/sec/channel. It is to be noted that other configurations, as well as other component values, for low-pass filter element 110 may be implemented, such as, for example, a filter order higher than 3. Such an implementation would provide for a sharper cut-off characteristic at the expense of increased cost and complexity.

Returning to FIG. 1B, the control logic element 120, up-down digital counter 115, sample and hold element 125, and latching comparator 130 operate to adaptively determine the optimum frequency gain boost, since the optimum boost depends on the physical location of the receiving device in the parallel databus structure. The control logic element 120 is coupled to each of the elements of apparatus 100 and, upon receiving an initiate adaptive equalization signal 140, the control logic element 120 causes apparatus 100 to adjust boost gain K of low-pass filter element 110 until the peak values of a high frequency data signal match a reference low-frequency voltage level.

The output of low-pass filter element 110 is coupled to sample and hold element 125, and latching comparator 130. As described in more detail below, the transmitting device transmits a training pattern comprising a low frequency (DC) signal and a high frequency signal. The transmitting device first asserts the low frequency signal portion of the training pattern and the amplitude of the signal is captured and stored by the sample and hold element 125. The transmitting device then asserts the high frequency signal portion of the training pattern, and latching comparator 130 compares the low-pass filtered output signal amplitude at this high frequency signal to the low frequency reference signal amplitude stored in sample and hold element 125.

The output of the latching comparator 130 is coupled to digital up/down comparator 115. The results of the comparisons between the amplitude of a high frequency signal at the low-pass filtered output and the stored reference low frequency signal amplitude is supplied to digital up/down comparator 115, which increments a count if the comparison is negative, (i.e., the magnitude of the high frequency signal at the low-pass filtered output is less than the reference voltage). Conversely, if the comparison is positive, digital up/down comparator 115 decrements the count (i.e., the magnitude of the low-pass filtered output signal is greater than the reference voltage). The output of digital up/down comparator 115 is fed back to the boost gain K input of low-pass filter element 110. In doing so, the digital up/down comparator 115 output controls the boost gain K, which is proportional to the digital up/down comparator 115 value and can range from 0 to a maximum gain value. The adaptively equalized signal 150 is then outputted from low-pass filter element 110.

Figure 3:
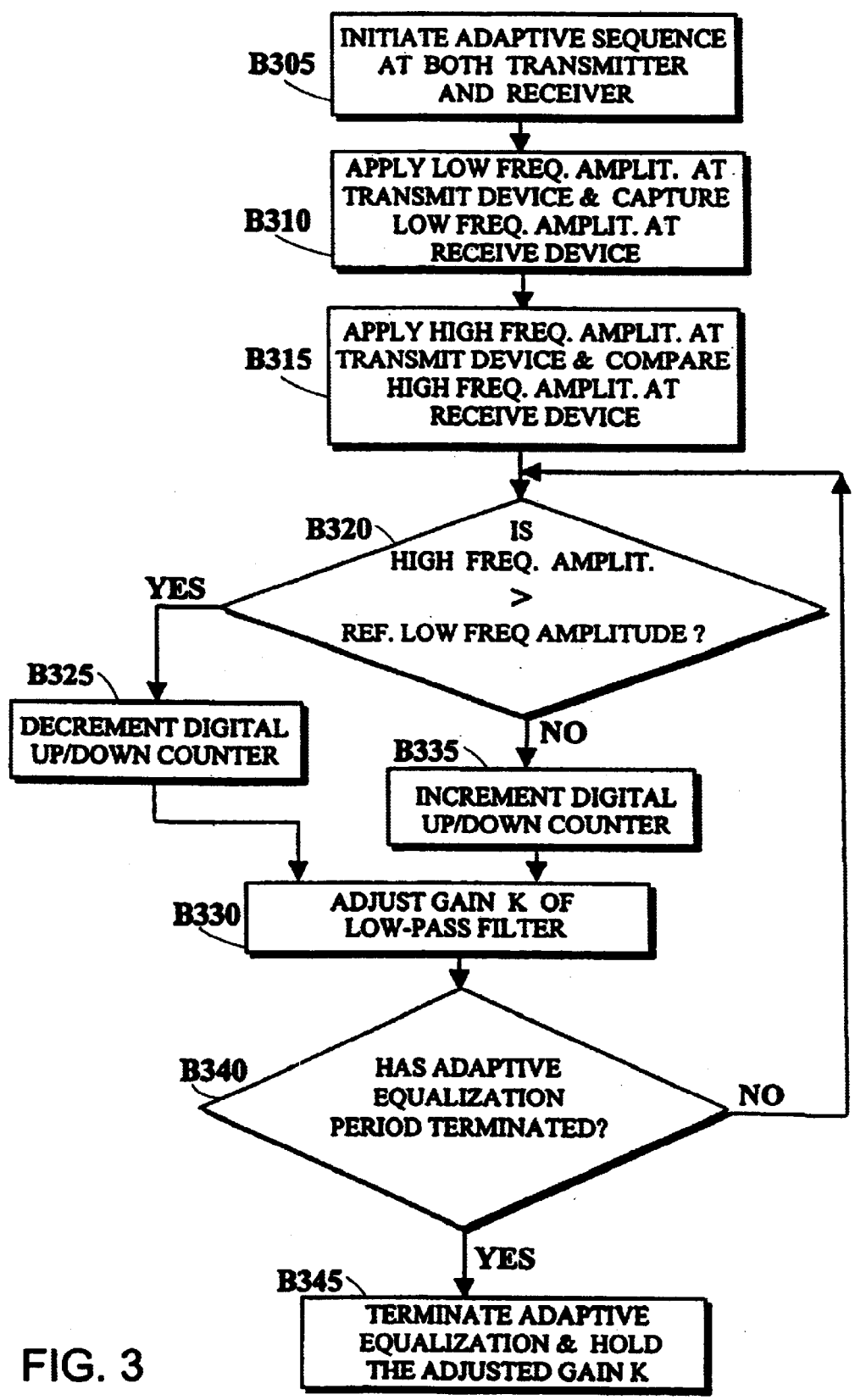
FIG. 3 is a high-level flow diagram depicting the operation of the illustrated embodiment.

FIG. 3 illustrates the operation of an embodiment of the present invention. In block B305, both the transmitting device 50 in FIG. 1A and apparatus 100 receive an initiate adaptive equalization signal 140, which begins the adaptive equalization process. In block B310, the transmitting device 50 asserts a DC voltage level equal to the normal low-frequency transmit signal amplitude and apparatus 100 captures the resulting asserted DC voltage level in the sample and hold element 125 at the output of low-pass filter element 110. The DC voltage level is asserted for a period of time long enough for the signal path to settle. For illustrative purposes, it is assumed that the DC voltage level asserted by the transmitting host device 50 is a negative voltage level, although a positive voltage level would be equally as effective in calibrating the digital data signals. The DC negative voltage level is captured and stored by the sample and hold element 125. The stored DC negative voltage level is used as the negative voltage reference by the latching comparator 130.

In block B315, transmitter 50 transmits a logic pattern "101010" which represents the highest transmission frequency. This logic pattern is supplied to the low-pass filter element 110, which outputs a filtered high frequency signal.

In block B320, apparatus 100 compares the-negative peak amplitude of the filtered high frequency signal outputted by low-pass filter element 110 to the reference DC voltage level stored in the sample and hold element 125. The latching comparator 130 performs the comparison operation by detecting whether the negative peak amplitude of this filtered ii high frequency signal is more negative than the negative DC voltage reference stored in sample and hold element 125. If it is, apparatus 100 directs, in block B325, the digital up/down counter 115 to count down.

If the negative peak amplitude of the filtered high frequency signal is less negative than the negative DC voltage reference, latching comparator 130 directs, in block B335, the digital up/down counter 115 to count up.

If the negative peak amplitude of the filtered high frequency signal is either greater than or less than the negative DC voltage reference, the apparatus 100, in block B330, adjusts the boost gain K of the low-pass filter element 110. As depicted in FIG. 1A, the output of the digital up/down counter 115 is fed back to the adjustable boost gain K input of low-pass filter element 110 to adjust the gain of the frequency boost in accordance with the value of digital up/down counter 115. The frequency boost gain K is proportional to the digital up/down counter 115 value and ranges from zero to a maximum gain. For example, in one embodiment, when the count value=0, the boost gain is adjusted to 0; when the count value=15 (maximum value), the boost gain is adjusted to 2 (maximum value). The frequency boost gain K consequently affects the amplitude of the high frequency filtered signal, which is fed back to the latching comparator 130.

After the gain K adjustments of block B330, the apparatus 100 determines, in block B340 whether the adaptive equalization period has terminated. Because complete calibration is ensured by simply causing the adaption to loop for a fixed number of cycles (large enough to allow the up/down counter to increment or decrement from its initial count to its final value ), this adaptive equalization period may be tracked, for example, by a counter that counts cycles. If the adaptive equalization period has not terminated, apparatus 100 adaptively loops back to block B320 for subsequent comparisons between the amplitude of the high frequency filtered signal and the reference DC voltage. This adaptive loop back continues until the negative peak amplitude of the filtered high frequency signal is sufficiently equivalent to the negative DC voltage reference. In other words, the frequency boost gain K of low-pass filter element 110 has been adjusted so that the amplitude of the filtered high frequency signal matches the value of the low frequency signal amplitude, stored in the sample and hold element 125 as the negative DC voltage reference.

If the adaptive equalization period has terminated, apparatus 100 progresses to block B345, where the adaptive equalization is terminated and the frequency boost gain K of low-pass filter element 110 is maintained.

Figure 4:
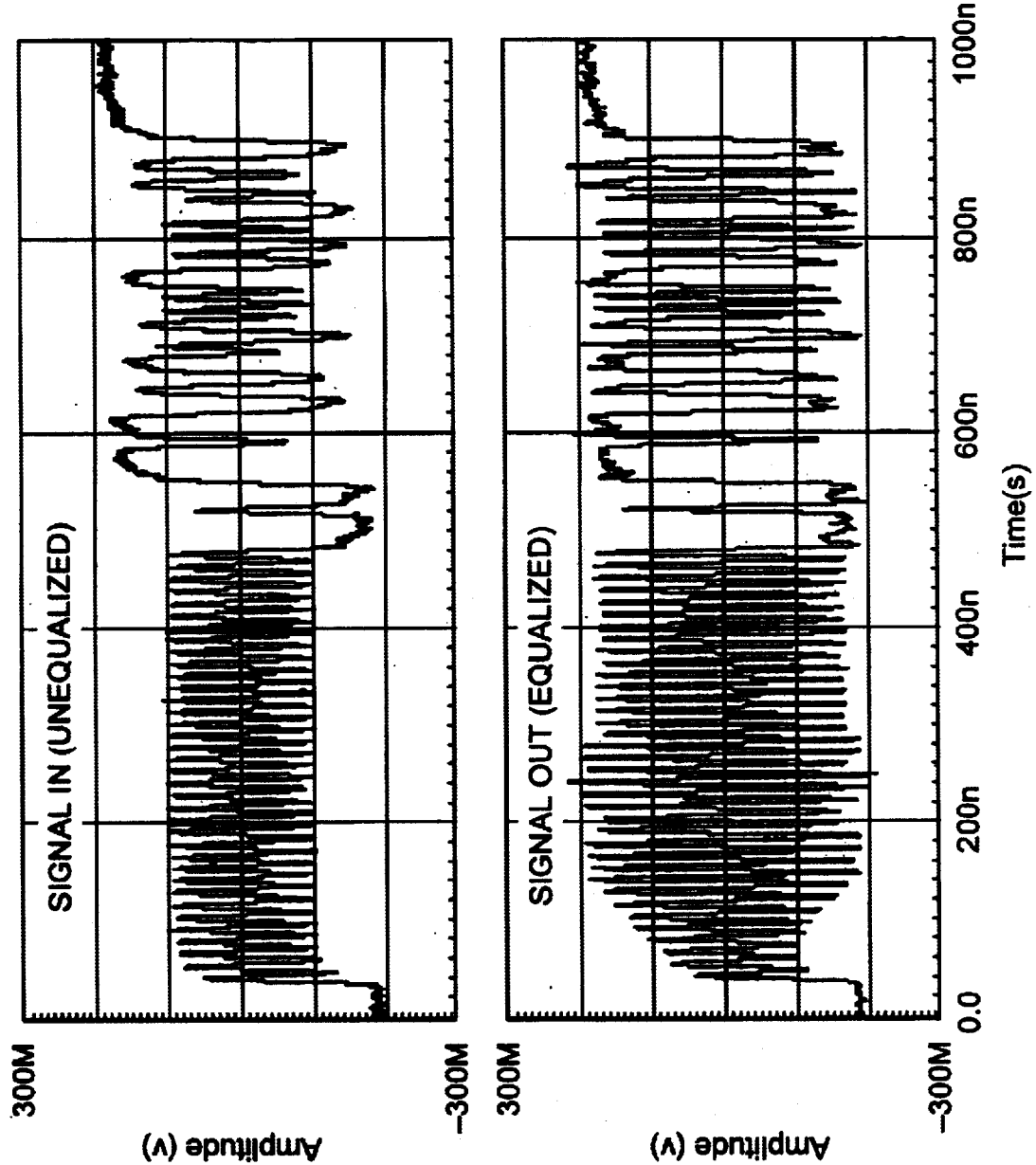
FIG. 4 illustrates the transient response of an unequalized signal and an adaptively equalized signal.

FIG. 4 illustrates the transient response of an unequalized signal, i.e., "signal in" 105, (top waveform) and an adaptively equalized signal, i.e., "signal out" 150, (bottom waveform) as implemented by the present invention. As stated above, the transmitting device 50 transmits different information during different time periods. For example, between 0 and 50 ns, the transmitting device asserts a DC voltage level of −200 mV; between 50 ns and 500 ns, the transmitting device transmits the high frequency pattern "101010"; and after 500 ns, the transmitting device transmits digital information-bearing signals. In addition, the adaptive equalization is performed between 0 ns and 300 ns, using the DC and "101010" patterns provided for this purpose.

For the unequalized signal, the peak amplitude of the high frequency transmission signal is approximately 100 mV, which is half of the asserted DC voltage level. Moreover, during the transmission of informational signals, the negative peak amplitude (and positive peak amplitude, for that matter) of the information-bearing signals vary substantially with data pattern. In fact, consecutive peaks can vary by as much as +/–100 mV. For the equalized signal, at about 120 ns and beyond, the magnitudes of both positive and negative peaks of the high frequency transmission signal are boosted so as to consistently approximate the asserted DC voltage level of –200 mV. Moreover, during the transmission of informational signals, the peak amplitudes of the information-bearing signals are substantially closer to the magnitude of the asserted DC voltage level and are not as dependent on the data pattern. In fact, the peak amplitude of isolated pulses beyond the zero value threshold is nominally doubled when compared to the unequalized isolated pulses.

Thus, by boosting the high frequency components, the amplitudes of the informational signals become relatively constant and proportional to the asserted low frequency signal amplitude and less dependent on the data pattern. As such, the ISI adaptive equalization apparatus 100 successfully mitigates the effects of ISI, thereby reliably accommodating high-speed data transfer over the existing SCSI cables. Moreover, apparatus 100 can be implemented in a digital IC fabrication process with relative ease, making it both an effective and an economically viable solution to current transfer speed limitations in SCSI environments.

It is important to note that the foregoing description of embodiments of the present invention provides illustration and description, but is not intended to be exhaustive or to limit the invention to the precise form disclosed. Modifications and variations are possible consistent with the above teachings or may be acquired from practice of the invention. The scope of the invention is defined by the claims and their equivalents.

What is claimed:

1. An apparatus for mitigating inter-symbol interference effects on an oscillating signal from which digital data will be obtained at a receive end of a channel, the inter-symbol interference being introduced into said oscillating signal as a result of transmitting said oscillating signal through the transmission channel over a substantial distance from a transmit device to the receive end of the channel, said apparatus comprising:
    a filter element receiving an input signal from said transmit device and outputting a filtered signal within a predetermined frequency band, said filter element having an adjustment mechanism for adjusting a boost gain for a given high range of frequencies within the predetermined frequency band;
    an amplitude determining mechanism for determining an amplitude difference value based on a comparison of a high frequency amplitude of the filtered signal in the given high range of frequencies compared to a low frequency amplitude of the filtered signal in a lower range of frequencies below the given high range of frequencies; and
    a frequency boost gain control mechanism for controlling adjustments to the boost gain based on said amplitude difference value.

2. The apparatus of claim 1, wherein said channel comprises at least one transmission line of a parallel bus comprising a plurality of transmission lines.

3. The apparatus of claim 2, wherein said filter element is configured as a low-pass filter and said input signal being transmitted on one of said plurality of transmission lines of said parallel bus.

4. The apparatus of claim 3, wherein said parallel bus is configured in accordance with a SCSI standard.

5. The apparatus of claim 4, wherein said gain control mechanism further includes a capture circuit to detect and capture a low-frequency voltage level asserted by said transmit device and to store said low-frequency level as a reference voltage representing said low frequency amplitude.

6. The apparatus of claim 4, wherein said boost gain control mechanism further includes a counting mechanism, said counting mechanism receiving said amplitude difference value and generating a counter value based on said amplitude difference value.

7. The apparatus of claim 6, wherein said counter value is fed back to said adjustment mechanism for adjusting the boost gain of said low-pass filter.

8. The apparatus of claim 7, further including,
    a control logic device that provides enabling signals to said low-pass filter, said amplitude determining mechanism, and said gain control mechanism.

9. The apparatus of claim 1, wherein the adjustments to the boost gain are controlled to reduce the amplitude difference value.

10. An adaptive equalization apparatus for mitigating inter-symbol interference effects on digital data transferred by a transmit device on a parallel bus, said adaptive equalization apparatus comprising:
    a low-pass filter element receiving an input signal from said device and outputting a filtered signal, said low-pass filter element having an adjustable frequency boost gain input for adjusting a gain value of said low-pass filter element;
    a latching comparator being coupled to said low-pass filter element and receiving said filtered signal, said latching comparator comparing an amplitude of said filtered signal in a given high range of frequencies with a threshold voltage level corresponding to an amplitude of said filtered signal in a lower range of frequencies below the given high range of frequencies and outputting a comparison value;
    a digital counter being coupled to said latching comparator and receiving said comparison value, said digital counter outputting a counter value based on said comparison value,
    wherein said counter value is supplied to said adjustable gain input of said low-pass filter element to adaptively control the gain value of said low-pass filter element in order to adjust the amplitude of said filtered signal to said threshold voltage level.

11. The adaptive equalization apparatus of claim 10, wherein said parallel bus is configured in accordance with a SCSI standard.

12. The adaptive equalization apparatus of claim 11, further comprising a sample and hold circuit for determining and storing as said threshold voltage level the amplitude of the filtered signal in the lower range of frequencies.

13. The adaptive equalization apparatus of claim 12, further including a control logic element for initiating an adaptive equalization operation by enabling said low-pass filter element, said sample and hold circuit said latching comparator, and said digital counter, said control logic element being synchronized with said digital counter by receiving a clocking signal.

14. A method for mitigating inter-symbol interference effects on an oscillating signal from which digital data will be obtained at a receive end of a channel, the inter-symbol interference being introduced into said oscillating signal as a result of transmitting said oscillating signal at a transmission frequency through the transmission channel over a substantial distance from a transmit device to the receive end of the channel, said method comprising:

receiving, by a filter element, an input signal from said transmit device, said filter element having a mechanism for adjusting a boost gain for a given high range of frequencies within the predetermined frequency band;

outputting, by said filtered element, a filtered signal;

determining an amplitude difference value based on a comparison of a high frequency amplitude of said filtered signal in the given high range of frequencies compared to a low frequency amplitude of the filtered signal in a lower range of frequencies below the given high range of frequencies; and controlling adjustments to the boost gain, by a boost control mechanism, so that based on said amplitude difference value.

15. The method of claim 14, wherein said channel is at least one transmission line of a parallel bus containing a plurality of transmission lines.

16. The method of claim 15, wherein said filter element is configured as a low-pass filter and said input signal is transmitted on one of said plurality of transmission lines of said parallel bus.

17. The method of claim 16, wherein said parallel bus is configured in accordance with a SCSI standard.

18. The method of claim 17, further including detecting and capturing a low frequency voltage level asserted by said transmitting device and storing said low frequency voltage level as a reference voltage representing said low frequency amplitude.

19. The method of claim 17, further including receiving said amplitude difference value, by a counting mechanism, and generating a counter value based on said amplitude difference value.

20. The method of claim 19, further including feeding back said counter value to said mechanism for adjusting the boost gain of said low-pass filter.

21. The method of claim 20, further including, providing enabling signals, by a control logic device, to said low-pass filter, said amplitude determining mechanism, and said boost gain control mechanism.

22. The method of claim 14, wherein the adjustments to the boost gain are controlled to reduce the amplitude difference value.

23. A method of mitigating inter-symbol interference effects on digital data transferred by a transmit device on a parallel bus, comprising:

receiving, by a low-pass filter element, an input signal from said transmit device, said low-pass filter element having an adjustable gain input for adjusting a boost gain value of said low-pass filter element;

outputting, by said low-pass filter, a filtered signal having a predetermined frequency band;

initiating adaptive equalization of said input signal;

detecting and storing as a threshold voltage level a low frequency voltage level corresponding to a low frequency amplitude of the filtered signal for a given low range of frequencies of the predetermined frequency band and storing it as a threshold voltage level;

comparing a high frequency amplitude of said filtered signal, for a given high range of frequencies of the predetermined frequency band above the given low frequency range, with said threshold voltage level and outputting a comparison value;

supplying said comparison value to a digital counter, said digital counter outputting a counter value based on said comparison value, wherein said counter value is supplied to said adjustable gain input of said low-pass filter element to adaptively control the gain value of said low-pass filter element in order to adjust the amplitude of said filtered signal to said threshold voltage level.

24. The method of claim 23, wherein said parallel bus is configured in accordance with a SCSI standard.

25. The method of claim 24, wherein said detecting a low frequency voltage level asserted by said transmit device is implemented by a sample and hold circuit.

26. The method of claim 25, wherein said comparing amplitude of said filtered signal with said threshold voltage level is implemented by a latching comparator.

27. The method of claim 26, wherein said initiating adaptive equalization is implemented by a control logic element that enables said low-pass filter element, said sample and hold element, said latching comparator, and said digital counter.

28. The method of claim 27, further including synchronizing said control logic element and said digital counter with a clocking signal.

* * * * *